United States Patent [19]
Viera

[11] Patent Number: 5,489,775
[45] Date of Patent: Feb. 6, 1996

[54] METHOD AND DEVICE FOR THE ENERGY-CALIBRATION OF AN ELECTRONIC UNIT FOR DETECTING BETA AND/OR X PHOTONS AND GAMMA RADIATIONS WITH COMPTON DISTRIBUTION EMITED BY A RADIOACTIVE AEROSOL

[75] Inventor: David D. Viera, Puyicard, France

[73] Assignee: Commissariat a l'Energie Atomique, Paris, France

[21] Appl. No.: 284,097

[22] Filed: Apr. 7, 1994

[30] Foreign Application Priority Data

Apr. 16, 1993 [FR] France .................................... 93 04514

[51] Int. Cl.⁶ ........................................................ G01T 1/24
[52] U.S. Cl. .................. 250/252.1; 250/370.06; 250/432 R
[58] Field of Search ...................... 250/252.1 R, 370.06, 250/432 R

[56] References Cited

U.S. PATENT DOCUMENTS

| 3,914,602 | 10/1975 | Goldstein | 250/253 |
| 5,055,691 | 10/1991 | Burgess | 250/370.07 |

FOREIGN PATENT DOCUMENTS

| 0079079 | 5/1983 | European Pat. Off. | 250/370.06 |
| 0189645 | 8/1986 | European Pat. Off. | |
| 2621704 | 10/1988 | France | |

OTHER PUBLICATIONS

J. B. Mitchell, S. Agami and J. A. Davies, "The Use of Si Surface Barrier Detectors for Energy Calibration of MeV Ion Acclerators," *Radiation Effects*, vol. 28 (1976) pp. 133–139. Gordon and Breach Science Publishers Ltd.

*Primary Examiner*—Constantine Hannaher
*Attorney, Agent, or Firm*—Burns, Doane, Swecker & Mathis

[57] ABSTRACT

Method for energy-calibrating an electronic unit for detecting, beta and/or X photons radiations and Compton distribution gamma radiations emitted by a radioactive aerosol and comprising two identical chains, one chain recording the spectrum (beta+photons) and the other the photons spectrum and dicriminating any indications, wherein this calibration is effected with the aid of alpha source as follows:

the two chains of alpha, beta and photons are identical and provided in the form of semiconductor detectors sufficiently thin so as to be only sensitive at the "Compton distribution" portion of the photonic spectrum;

each of the semiconductor detectors is subjected to an alpha standard source with a known energy and being identical for each source, and the spectrum of the alpha particles of the corresponding source is recorded on each chain;

the energetic calibration of each of the chains is made to correspond with the almost vertical descending front of the alpha spectrum of the standard sources so as to adjust the two chains identically with energy.

2 Claims, 2 Drawing Sheets

METHOD AND DEVICE FOR THE ENERGY-CALIBRATION OF AN ELECTRONIC UNIT FOR DETECTING BETA AND/OR X PHOTONS AND GAMMA RADIATIONS WITH COMPTON DISTRIBUTION EMITED BY A RADIOACTIVE AEROSOL

FIELD OF THE INVENTION

The present invention generally concerns the detection of radioactive aerosols and determining their beta and photonic (X and gamma) activity with Compton distribution.

BACKGROUND OF THE INVENTION

In order to detect and examine the presence of radioactive aerosols passed into the atmosphere, the method is known on how to monitor this presence through a filter on which the aerosol particles are retained and thus analyse the filtrate collected in front of specialized counting devices. These radioactive particles disintegrate, thus producing either alpha and beta (electrons) rays which are solid fragments, or X electromagnetic and gamma photons.

The spectrums obtained with the alpha particles have energies generally situated above 3 MeV and thus are easily differentiated from beta spectrums and the "Compton distribution" of photonic spectrums which, on the other hand, are situated in a given field of energy of several tens of KeV within 3 MeV. The alpha spectrums in addition have the advantageous property of comprising as regards the high energies a fast descent front which is almost vertical in energy/amplitude coordinates (FIG. 1).

However, the beta and photonic spectrums coinciding with energy are more difficult to separate.

The technique currently used to separately record the beta particles and the photons (X, gamma) consists of recording the sum of the beta+ spectrums (X, gamma) and then of inserting screens between the radioactive deposit to be measured and the detector, these screens stopping the beta particles; thus, the sole contribution due to the photons (X, gamma) is determined. A simple subtraction of the spectrums (X, gamma) from the sum of the beta + (X, gamma) spectrums makes it possible to know the spectrum of solely the beta particles.

In order that the result of this subtraction has the best possible significance, it is essential that the "responses" to the various radiations of the two detection chains are the same. This lays down two conditions, namely the identity of the chains and their energy-adjustment.

In order to achieve this, it is current practice to record the various beta and (X, gamma) spectrums with the aid of two strictly identical detection chains, the semiconductor detectors being placed extremely close to each other, one being used for overall beta+ (X, gamma) detection and the other provided with a screen absorbing the betas being used to solely detect the photons (X, gamma).

Another condition required to accurately know the contribution of the spectrum (X, gamma) within the overall spectrum and thus so as to accurately determine the beta spectrum(s) is the identical accurate adjustment in energy of the two counting chains.

According to the prior art, energy-calibration is effected with a standard beta source and a standard gamma source by means of the "yield method" which, for each of the standard gamma or beta sources used, consists of recording inside a specific geometry and for a defined energy window width and position a specific number of pulses per unit of time. By adjusting the gain of the counting chain, re-adjustment takes place on the defined "energy window".

But this calibration is only valid for the energy corresponding to that of the standard source. Secondly, these "windows" have a certain width, thus leading to a certain inaccuracy concerning the energy-adjustment.

The energy-adjustment of the invention is able to fully suppress these inaccuracies by using simple effective means.

SUMMARY OF THE INVENTION

The aim of the present invention is to provide a method for the energy-calibration of a unit for the electronic detection of beta and/or X phonons and Compton distribution gamma radiations emitted by a radioactive aerosol and comprising two identical chains, one chain recording the spectrum (beta+photons) and the other the photons spectrum and discriminating the difference of the various indications, wherein this calibration is effected with the aid of alpha sources as follows:

the two alpha, beta photons detector chains are identical and provided in the form of semiconductor detectors sufficiently thin so as to be only sensitive to the "Compton distribution" portion of the photonic spectrum;

each of the semiconductor detectors is subjected to a standard alpha source with a known energy identical for each source, and the spectrum of the alpha particles of the corresponding source is recorded on each chain;

the energetic calibration threshold of each chain is made to correspond with the almost vertical descent front of the alpha spectrum of the standard sources so as to adjust the two chains identically with energy.

The originality of the present invention resides in the unexpected findings due to the fact that the two special features mentioned earlier of the alpha radiation spectrums emitted by radioactive aerosols (energy exceeding 3 MeV and descent front of the spectrum extremely fast and almost vertical, that is monoenergetic) would make it possible to calibrate a beta radiation measuring chain with the aid of an alpha radiation, that is with a nature differing from those it is sought to measure. Furthermore, the beta radiations and photons, although superimposed with energy, do not intermingle with the alpha radiation which has a higher energy, which clearly facilitates their separation from the alpha radiation. Finally, the fact of selecting the two chains of alpha, beta and photons detectors in the form of sufficiently thin semiconductor detectors so as to enable it to be traversed by the energetic peak of the photons and be only sensitive to the Compton distribution portion of this spectrum also makes it possible to solely take into consideration the really effective portion of the photonic spectrum. The coincidence energetic placing of the two descent fronts of the alpha spectrum of the standard sources makes it possible to ensure that the two chains shall accordingly behave identically with energy with regard to the radiations they shall have to analyse.

The invention shall be more readily understood from a reading of the following non-restrictive description given by way of example of an embodiment with reference to the accompanying drawings on which:

DETAILED DESCRIPTION OF THE PREFERRED EMBODMENTS

Figure 1:
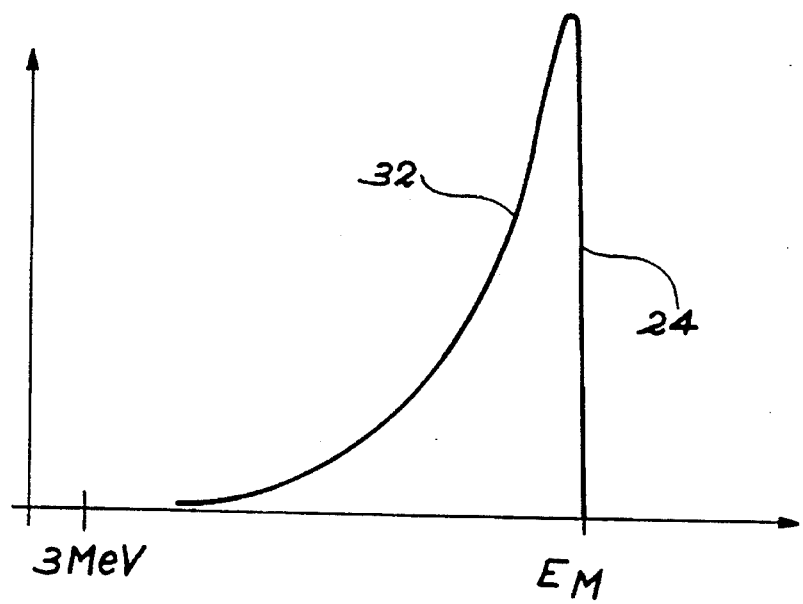
FIG. 1 shows in cartesian coordinates, counting=F (energy), the alpha spectrum of a standard source.
Figure 2:
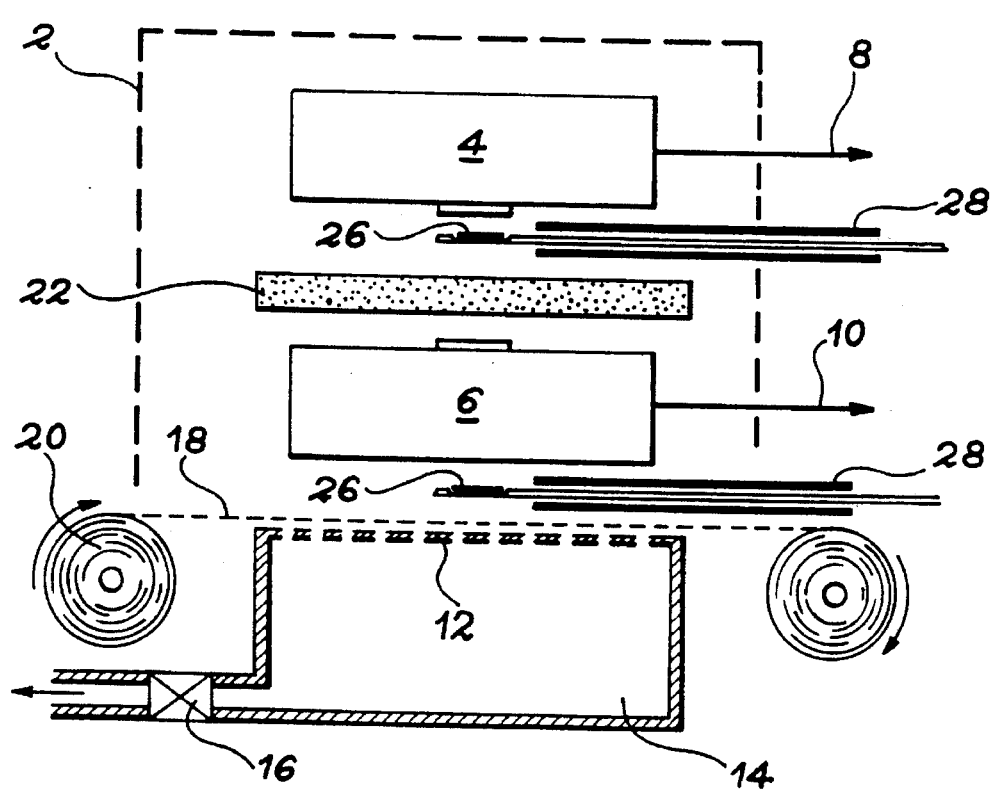
FIG. 2 is a diagrammatic view of the measuring head of a unit for detecting the beta and/or X photons and gamma radiations conforming to the invention.

In accordance with the invention, FIG. 2 shows in a thick lead shielding 2 the two identical thin semiconductor detectors 4 and 6 and able to transform into pulses the arrival of an alpha or beta particle or an X photon or gamma particle. The electric charges coming from the semiconductor detector 4 are sent to the electronic channel 8 and the pulses coming from the semiconductor detector 6 are addressed to the electronic channel 10. It ought to be mentioned here that a thin semiconductor detector is understood to be a device of the type able to record the Compton distribution portion of the spectrum of a photon, but not the photoelectric peak of said photon. Disposed under the two semiconductor detectors 4 and 6 is a filtering support 12 closing a suction chamber 14 provided with a vacuum pump and a flowrate regulator 16. Moving sequentially in front of this grill 12 is a filter 18 able to retain radioactive aerosols present in the atmosphere to be examined. This filter 18 winds off automatically under the control of an unwinder 20. In accordance with the invention, a screen 22 is provided between the two semiconductor detectors 4 and 6 so as to absorb the alpha and beta particles emitted by placing radioactive aerosols on the filter 18. This thus results from a specialization of the two semiconductor detectors 4 and 6, the first one 4 only receiving the photons and the second 6 the alpha, beta and photon radiations. As shall be seen on FIG. 1, as the alpha radiation still has an energy exceeeding 2 MeV and does not intermingle with the energetic bands reserved for the beta and photon radiations, this alpha radiation can thus be easily sorted through an approriate energy window. The subtraction of the indications of the semiconductors 4 and 6 accordingly acquires the sought-after information concerning the intensity of the beta radiations and photons.

As can be seen on FIG. 1, the known shape of an alpha radiation spectrum, whose descent front 24 is almost vertical in the graph (counting, energy) takes place for the maximum energy Em. This alpha radiation spectrum occupies in the band of energies a zone still situated above 3 MeV.

The elements described up until now in FIG. 2 are common with those of the prior art in this electronic detection unit. According to the invention and so as to implement the original calibration method of this unit, placed close to the semiconductor detectors 4 and 6 is a standard alpha source 26 able to retract into a position guide 28. For example in practice, these sources 26 are placed at the end of a retractable needle which slides into the position guide 28 so that at the outgoing position, the source 26 is visible from the semiconductor detectors 4 and 6 and in the retracted position the radiation is masked from said semiconductor detectors.

Figure 3:
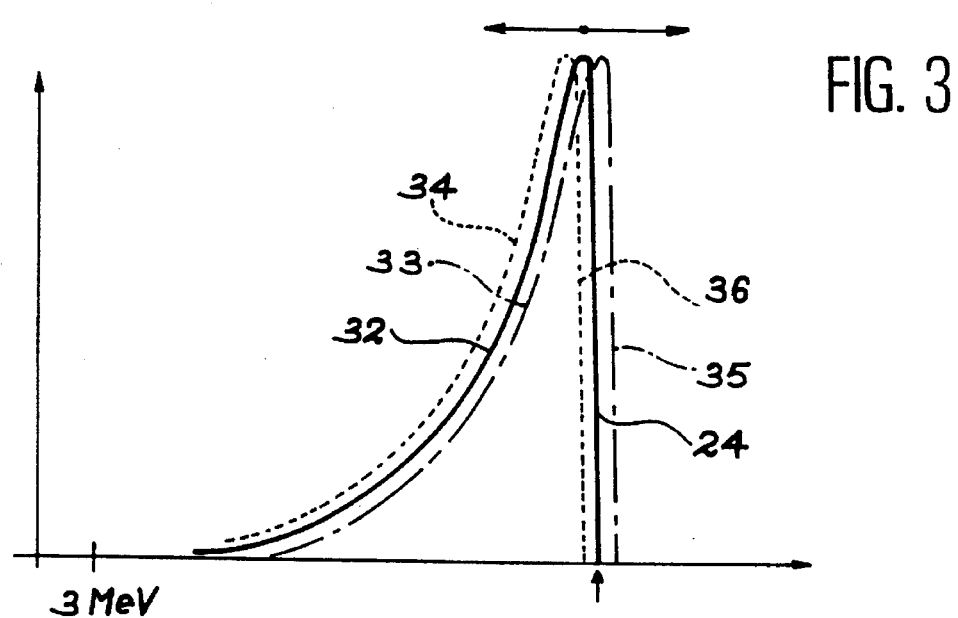
FIG. 3 shows in cartesian coordinates, counting=F (energy), the alpha spectrums of the standard source and of the two chains of the unit of the invention around the calibration threshold at the time of energy-adjustment.

FIG. 3 shows how the energy-calibration is effected of the two chains comprising the detection unit of the invention. As the alpha calibration threshold is defined by the vertical front 24 of the standard alpha spectrum 32 due to the sources 26, an examination is made to discover exactly where are the responses 35 and 36 of each of the chains and it then merely suffices to adjust the actual gains of said chains so as to have the descent fronts of the spectrums 33 and 34 coincide with the descent front 24 corresponding to the calibration threshold for the alpha spectrum of the source 26 used for calibration. It is then certain at this moment that the two chains comprising the detection unit have the same energetic scale which, without introducing any systematic error, renders possible the subtraction of their two indications so as to separately obtain the counting rate of the beta, gamma and X photons radiations.

Figure 4:
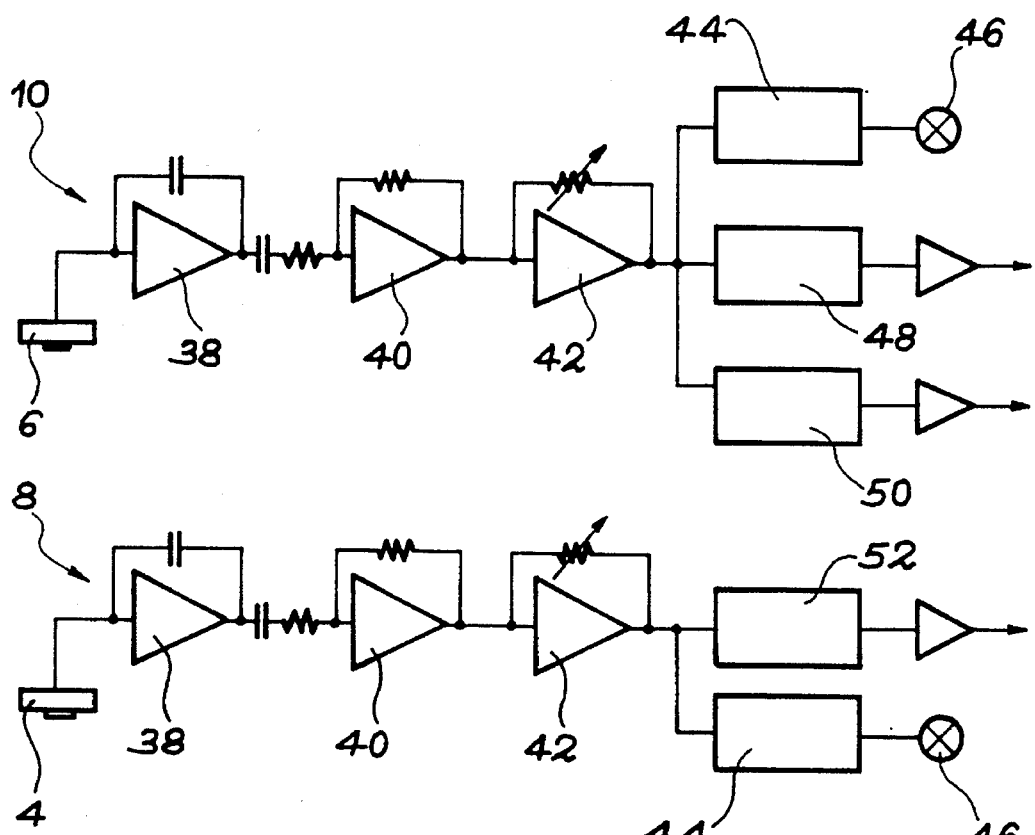
FIG. 4 is a diagram of the known electronic portion of said beta and/or X photons and gamma radiation detection unit.

FIG. 4 shows the electronic diagram of the portion of the detection unit associated with the measuring head of FIG. 2. This electronic circuit is a known type of circuit and shall be accordingly described briefly.

This figure shows the semiconductor detectors 4 and 6 associated with the channels 8 and 10, already described on FIG. 2.

Each of the channels 8 and 10 comprises a charge preamplifier 38, a circuit for shaping the pulses 40, and a gain adjustment circuit 42 with which the calibration threshold of each chain is accurately energy-adjusted. This calibration threshold is recorded at 44 and displayed by an indicator light 46.

It merely suffices to control the appearance of the flashing of the indicator light 46 so as to be ensured of the accurate energy-adjustment of the corresponding measuring chain.

The alpha pulses with energy exceeding 3 MeV are accounted in the window 48 and the subtraction of the alpha, beta and photon pulses of channel 10 and the photons of channel 8 is effected at the level of the windows 50 (beta) and 52 (photons).

An expert in this field in each particular case shall be able to select the material constituting the radioactive calibration sources 26 and, for example, may simply resort to using polonium sources, such as $_{84}^{208}$ Po and americium sources, such as $_{95}^{241}$ Am which are emitters of alpha particles with their descent fronts situated respectively at 5.11 MeV for the polonium and at 5.47 MeV for the americium.

What is claimed is:

1. A method for energy-calibrating of an electronic unit for detecting beta radiations and/or X photons and gamma radiations with a Compton distribution emitted by a radioactive aerosol and comprising two identical chains, one chain recording the spectrum (beta+photons) and the other the photons spectrum and discriminating the difference of the indications, wherein this calibration is effected with the aid of alpha sources according to the steps of:

providing two alpha, beta chains of detectors that are both identical, in the form of sufficiently thin semiconductor detectors so as to be only sensitive to the "Compton distribution" portion of the photonic spectrum;

subjecting each of the semiconductor detectors to an alpha standard source with a known energy that is identical for each source;

recording on each chain the spectrum of the alpha particles of the corresponding source;

energy calibrating each of the chains to correspond with the almost vertical descending front of the alpha spectrum of the standard sources so as to adjust the two chains identically with energy.

2. An apparatus for implementing energy calibration of an electronic unit for detecting beta radiations and/or X photons and gama radiations with a Compton distribution comprising:

means for detecting including two identical chains, one chain recording the spectrum (beta and photons) and the other for the photons spectrum, wherein the means for detecting includes two adjacent sufficiently thin semiconductor detectors that are only sensitive to the "Compton distribution" portion of the photonic spectrum;

a sheath with at least one retractable alpha source;

a screen, separating the detectors, for absorbing the alpha and beta particles;

means for energy calibrating each of the chains to correspond with the almost vertical descending front of the alpha spectrum of the standard sources; and means for adjusting the two chains identically with energy, wherein the means for detecting is temporarily subjected to the radiation of the at least one alpha source.

* * * * *